June 9, 1925.                                           1,541,731
C. MUGUET
TREATMENT OF ORE IN BLAST FURNACES
Filed Sept. 28, 1923
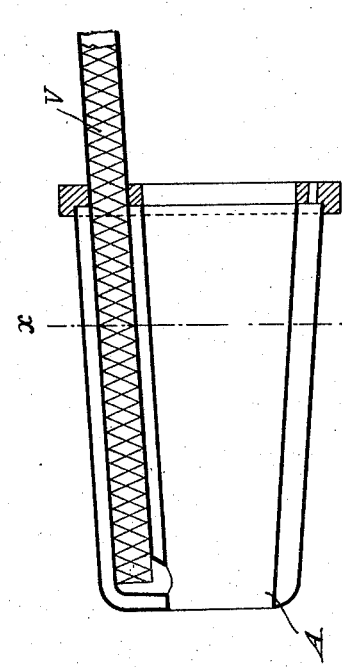
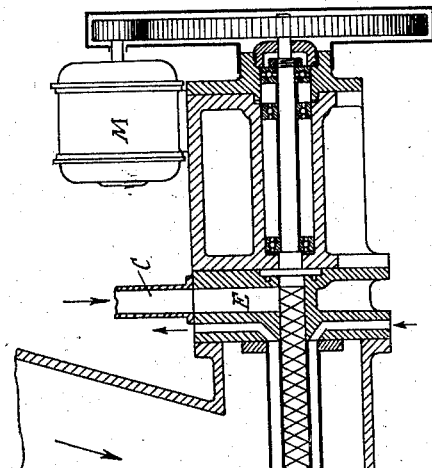
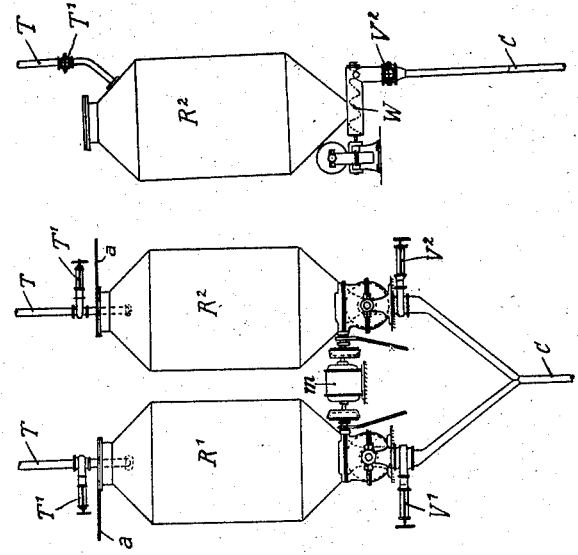
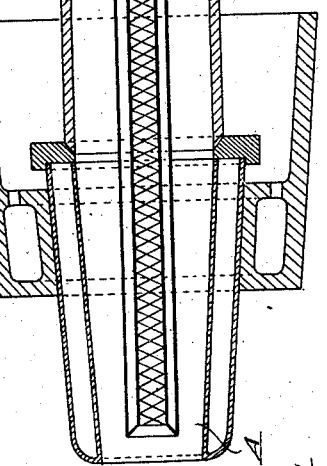
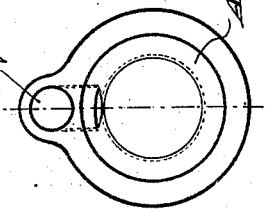
INVENTOR
Claude Muguet
BY
Mauro, Cameron, Lewis & Kerkam
ATTORNEYS.

Patented June 9, 1925.

1,541,731

UNITED STATES PATENT OFFICE.

CLAUDE MUGUET, OF PARIS, FRANCE, ASSIGNOR TO SOCIÉTÉ ANONYME DE COMMENTRY, FOURCHAMBAULT & DECAZEVILLE, OF PARIS, FRANCE.

TREATMENT OF ORE IN BLAST FURNACES.

Application filed September 28, 1923. Serial No. 665,419.

*To all whom it may concern:*

Be it known that I, CLAUDE MUGUET, a citizen of France, and a resident of Paris, France, have invented new and useful Improvements in the Treatment of Ore in Blast Furnaces, which is fully set forth in the following specification.

In blast furnace practice, the fuel generally consists of coke which is charged into the mouth of the furnace alternately with the ore. A portion of the coke is burned directly to carbon dioxide adjacent the blast nozzles by means of air which is delivered at high temperatures attaining 800 degrees C. and above, thus producing a very high heat. The carbon dioxide when in contact with the coke at a white heat becomes converted into carbon monoxide, with consumption of a weight of carbon equal to that contained in the carbon dioxide above mentioned. Lastly, the stream of gas rising through the charge in the furnace contains only nitrogen and carbon monoxide which constitutes the reducing agent for the iron ore.

It has already been proposed to supply fuel through the nozzles of a blast furnace, but hitherto the methods proposed for this purpose failed to give satisfaction because proper attention had not been given to the normal operating conditions of blast furnaces.

It has been proposed for instance to replace the whole amount of coke in the charge by powdered carbon introduced together with the air into the furnace through the blast nozzles, and the furnace is exclusively charged with the ore and with suitable fluxes.

In the latter process, the air which is mixed with the powdered fuel injected is used in such proportion that the combustion substantially produces only the carbon monoxide which is intended for the reduction of the ore.

But a process of this kind does not take account on the one hand of the necessity of maintaining a sufficient permeability for the blast furnace charge, this not being obtained when the charge consists only of ore and flux, because these substances become caked together by the heat and prevent the passage of the stream of carbon monoxide; nor on the other hand of the necessity of employing a very high temperature in the region of the blast nozzles in order to insure the melting of the slag and of the metallic particles resulting from the reduction of the ore by the carbon monoxide.

In the usual operation of the blast furnace, the charge is made permeable by the coke which is fed into the furnace alternately with the ore and flux, and the high temperature adjacent the nozzles is had by the combustion to carbon dioxide in the hot blast, of a part of the coke of the charge which attains the level of the nozzles, this carbon dioxide being converted into carbon monoxide when in contact with the superposed incandescent coke, which carbon monoxide forms the reducing agent for the ore.

For these reasons, the methods hitherto proposed for replacing the whole or a part of the coke of the charge by powdered fuel supplied through the blast nozzles could not and as was shown did not in fact produce any practical results.

With due consideration of the practical conditions of blast furnace operation as above disclosed, the present invention has for its object to replace the whole or a part of the amount of coke which is burned to carbon dioxide in the hot blast from the nozzles (which amount represents a maximum of 50 per cent of the coke of the charge) by powdered fuel, which may consist of coal of all kinds, anthracite, coke, charcoal and like fuels, and which is introduced at this point while maintaining in the furnace charge the proper amount of coke to insure the permeability of the said charge to the gases.

The introduction of said powdered fuel is so regulated that:

1. It will be entirely burned to carbon dioxide.

2. The normal temperature of the hot blast will remain unchanged.

A very high temperature is thus obtained next the blast nozzles, and this is practically the same as is produced in the usual method by burning the amount of coke referred to in the preceding paragraph to carbon dioxide, which amount I now economize by replacing it by the powdered fuel supply as above mentioned. This very high temperature is absolutely necessary for the normal operation of the blast furnace and for the production of the various grades of iron which are to be manufactured in the furnace.

The highly heated blast of carbon dioxide thus delivered into the furnace will when adjacent the nozzles come into contact with the coke which I continue to introduce into the charge in a reduced amount which is however sufficient to insure its permeability and to convert the whole of the above-mentioned carbon dioxide into carbon monoxide which will act in the upper and lower parts of the furnace to reduce the ore as above stated.

In a blast furnace employing charcoal, I may in like manner replace a part of the charcoal by powdered fuel in the same way as for the furnace using coke.

The process according to the invention thus takes due account of the essential conditions for the good operation of the blast furnace, these being the maintenance of the proper permeability of the charge and a high temperature in the region of the nozzles.

My invention further relates to apparatus for the supply and the projection of powdered fuel into an air blast having for instance a temperature of 760 to 800 degrees C.

The said fuel should be delivered at the mouth of the nozzle without change or premature ignition, and should be projected in a continuous manner, as well as regularly distributed in the hot blast from the nozzle. The amount of fuel projected should be properly regulated for each nozzle, so as to insure the regular descent of the charge in the furnace, for if this condition were not fulfilled, the charge would descend in an irregular manner and the furnace would soon cease to operate.

A considerable advantage is to be had by varying at the same time the amount of fuel delivered by each nozzle into the furnace, as will be further disclosed. Special measures are to be taken so as to prevent any back movement of hot air into the projection apparatus, supply conduits and powdered fuel chambers, for such air might ignite the fuel and even cause explosions.

This invention can be more readily understood by reference to the accompanying drawings which illustrate apparatus adapted for carrying out the present process.

In said drawings: Fig. 1 is a vertical section through a blast chamber, showing a nozzle provided with a helical fuel-feeding device.

Figs. 2 and 3 illustrate in front and side elevations respectively, fuel hoppers to be disposed at a level above the blast nozzles.

Fig. 4 is a longitudinal section through another form of blast nozzle and fuel-feeding device, and Fig. 5 is a section on the line X—X of Fig. 4.

In my first arrangement, the essential element for feeding the powdered combustible to the end of the nozzle consists of a helical screw which may be disposed within the blast chamber or outside the latter, the said screw serving both for the feeding and the projection of the powdered fuel; the screw is contained in a feed tube provided with water cooling and mounted on the rear cover of the blast chamber. The said screw is coaxial with the blast tube and is maintained at the rear in a long bearing block with which ball bearings may be employed. An electric motor M drives the said screw at a suitable speed and if necessary through the medium of a speed-reducing element. The said screw is preferably of the double thread type in order to avoid clogging, and the threads are suitably upturned so as to project the fuel according to the flaring conical end of the feed tube. The speed of the screw is such that the fuel is projected at a high rate into the hot blast which at once takes it up, and the fuel is thus caused to burn with formation of carbon dioxide at the end of the blast furnace nozzle A.

The powdered fuel is supplied at the other end of the said screw through a tube C which is disposed between the cover of the blast chamber and the supporting bearing.

The whole arrangement may be readily removed from the nozzle by taking off the four keys which secure the cover of the blast chamber to the head.

At a higher level, for instance at the level of the bracket-rim are disposed side by side and above each nozzle the two feed chambers $R^1$ and $R^2$ serving as hoppers for the fuel, as shown in the front view Fig. 2 and in the side view Fig. 3, each hopper having at the bottom a helical feeding screw W operating at variable speed, or a like device which will be readily understood, providing for the regular feed of the projection apparatus through the tube C connected with the end E of the screw of said apparatus, as above indicated.

The said containing hoppers can be closed at the top by fluidtight valve, e. g. a gate valve $a$ by analogy to what is in use for hot air blast apparatus, so as to provide air pressure in the feed chamber which is being emptied and above the fuel, by means of a pipe T connected with a blowing machine, said pipe having the gate valve $T^1$ serving to maintain a sufficient pressure in the chamber which is operative, because it is desired to prevent the hot air blast from proceeding by way of the said screw which does not form a tight joint and through the combustible thereby igniting the same or caking it together. A single motor $m$ serves to operate the feeding screw of each set of chambers, and when one chamber is put in use the other is uncoupled. By connecting the several motors for the nozzles to a common rheostat, it will be feasible by a simple control of the handle of the rheostat to vary in an instantaneous manner and in the same proportion the fuel supplied to each nozzle, thus affording means for counteracting in an immediate manner and within certain limits any variations which may occur in the operation of the blast furnace. Each of the said motors may be further controlled separately should it be desired to supply different amounts of fuel to the several nozzles.

The gates $V^1$ and $V^2$ may be used to cut off the fuel feed tube from either of the said chambers, so as to provide for the filling of one of the chambers with fuel while the other chamber is supplying fuel to the nozzle. The capacity of each chamber is such that it will supply the corresponding nozzle for the whole time occupied in filling the other chamber with powdered fuel.

In the modification shown in Fig. 4 in longitudinal section and in Fig. 5 in section on the line $x$—$x$, the fuel feed screw is contained in a tube which is formed in the upper part of the blast furnace nozzle, said tube opening into the top part of the nozzle orifice through an aperture of suitable shape whereby the powdered fuel supplied by the screw shall be sprayed into the current of hot air. The blast furnace nozzle has a special shape in order to contain the fuel feed tube. The said screw is actuated and supplied with fuel as in the preceding case.

This arrangement has the advantage of leaving the blast conduit and the nozzle entirely free.

With the use of powdered fuel I am enabled not only to vary the amount of fuel burned at the nozzles according to needs and in a very rapid manner, but further to act upon the composition of the slag by adding to the fuel during the crushing process such material as very fine silicious sand, lime, or preliminarily ground fluorspar.

By the use of all these facilities, the operation of the blast furnace becomes much easier, and with less risk of accident, since I am able to furnish the remedy as soon as it is needed.

Various combustibles may be employed, starting with anthracite, coke and charcoal and proceeding to coal having a large proportion of volatile substances, according to the desired quality of the iron to be produced.

The advantages to be obtained by the use of powdered fuel in blast furnace practice when carried out in the conditions according to my invention may be stated as follows.

1. Saving of coke, which may attain 50 per cent over the known processes.
2. Increased output of the blast furnace by reason of the reduction of volume of coke in the charge.
3. Reduction of the amount of fuel employed with corresponding increase in the output of the furnace.
4. Reduced cost, for the following reasons:
   (a) Due to the substitution of powdered fuel for a part of the coke.
   (b) Due to the reduction of the amount of fuel employed.
   (c) Due to the reduced cost of manufacture, since a greater output of product is obtained.
5. Any departures from the normal operation of the furnace can at once be corrected, such as cooling or changes occurring in the composition of the slag, whence a further reduction in the cost price and a more regular manufacture.

Obviously, the embodiments hereinbefore described may be subject to various modifications without departing from the spirit of the invention.

What I claim is:

1. A process of treatment of iron ore in blast furnaces, which consists in injecting into the blast furnace, at the level of the blast nozzles, powdered fuel which is entirely consumed to carbon dioxide, and adding to the charges of ore introduced into the furnace a quantity of coke is necessary to insure the permeability of the charges to the gases and the reduction to carbon monoxide of the total amount of carbon dioxide produced by the combustion of the said powdered fuel.

2. A process of treatment of iron ore in blast furnaces, which consists in injecting into the blast furnace, at the level of the blast nozzles, powdered fuel which is entirely consumed to carbon dioxide, without practically affecting the normal temperature of the hot air blast, and adding to the charges of ore introduced into the furnace a quantity of coke necessary to insure the permeability of the charges to the gases and the reduction to carbon monoxide of the total amount of carbon dioxide produced by the combustion of the said powdered fuel.

3. A process for the treatment of iron ore in blast furnaces, which consists in injecting into the furnace at the level of the hot blast nozzles a quantity of powdered carbon fuel not to exceed one-half the total amount of carbon fuel consumed in the furnace, converting the powdered fuel into carbon dioxide by the hot air of the blast, and loading ore into the furnace together with a quantity of coke adapted to insure the permeability of the charges to the gases and the reduction to carbon monoxide of the total amount of carbon dioxide produced by the combustion of said powdered fuel.

4. A process for the treatment of iron ore in blast furnaces, which consists in injecting into the furnace through the hot blast nozzles a quantity of powdered carbon fuel not to exceed one-half the total amount of carbon required for the reduction of the ore, converting the powdered fuel into carbon dioxide by the hot air of the blast, and loading ore into the furnace together with a quantity of coke adapted to insure the permeability of the charges to the gases and the reduction to carbon monoxide of the total amount of carbon dioxide produced by the combustion of said powdered fuel.

5. A process for the treatment of iron ore in blast furnaces, which consists in injecting into the furnace at the level of the hot blast nozzles a quantity of powdered carbon fuel equal to one-half the total amount of carbon required for the reduction of the ore, converting the powdered fuel into carbon dioxide by the hot air of the blast, and loading ore into the furnace together with a quantity of coke adapted to insure the permeability of the charges of the gases and the reduction to carbon monoxide of the total amount of carbon dioxide produced by the combustion of said powdered fuel.

6. A process for the treatment of iron ore in blast furnaces, which consists in injecting into the furnace a quantity of powdered carbon fuel delivered at the end or mouth of the nozzles and not exceeding one-half the total amount of carbon required for the reduction of the ore, converting the powdered fuel into carbon dioxide by the hot air of the blast, and loading ore into the furnace together with a certain quantity of coke adapted to insure the permeability of the charges to the gases and the reduction to carbon monoxide of the total amount of carbon dioxide produced by the combustion of said powdered fuel.

In testimony whereof I have signed this specification.

CLAUDE MUGUET.